(12) United States Patent
Magliacano

(10) Patent No.: US 10,906,471 B2
(45) Date of Patent: Feb. 2, 2021

(54) MOBILE TANK MOUNTING SYSTEM

(71) Applicant: Matthew Magliacano, Cleveland, MO (US)

(72) Inventor: Matthew Magliacano, Cleveland, MO (US)

( * ) Notice: Subject to any disclaimer, the term of this patent is extended or adjusted under 35 U.S.C. 154(b) by 0 days.

(21) Appl. No.: 16/398,997

(22) Filed: Apr. 30, 2019

(65) Prior Publication Data

US 2020/0324707 A1 Oct. 15, 2020

Related U.S. Application Data

(63) Continuation of application No. 29/687,232, filed on Apr. 11, 2019.

(51) Int. Cl.
*B60R 7/08* (2006.01)
*B60R 11/00* (2006.01)

(52) U.S. Cl.
CPC ............... *B60R 7/08* (2013.01); *B60R 11/00* (2013.01); *B60R 2011/0045* (2013.01); *B60R 2011/0071* (2013.01)

(58) Field of Classification Search
CPC .................................. B60R 7/08; B60R 11/00
USPC ....................... 224/547, 148.4, 148.6, 148.7; 248/221.11, 223.31, 222.11
See application file for complete search history.

(56) References Cited

U.S. PATENT DOCUMENTS

| | | | | |
|---|---|---|---|---|
| 1,018,696 A | * | 2/1912 | Cronk | B60R 9/06 224/511 |
| 2,550,554 A | * | 4/1951 | Griffin | A47G 19/2222 224/197 |
| 3,620,491 A | * | 11/1971 | Baclit | A61J 9/0607 248/106 |
| 3,848,785 A | * | 11/1974 | Bott | B60R 9/12 224/319 |
| 4,735,350 A | * | 4/1988 | Kamaya | B60R 9/048 224/315 |
| 4,867,362 A | * | 9/1989 | Finnegan | B60R 9/045 224/319 |
| 4,930,671 A | * | 6/1990 | Tittel | B60R 9/12 224/315 |
| 5,102,020 A | * | 4/1992 | Walker | B65D 43/18 220/476 |
| 5,170,981 A | * | 12/1992 | Lin | B62J 11/00 224/414 |
| 5,390,840 A | * | 2/1995 | Arvidsson | B60R 9/12 224/315 |
| 5,390,886 A | * | 2/1995 | Lawner | B63C 11/02 248/224.7 |
| 5,657,913 A | * | 8/1997 | Cucheran | B60R 9/12 224/309 |

(Continued)

*Primary Examiner* — Nathan J Newhouse
*Assistant Examiner* — Lester L Vanterpool
(74) *Attorney, Agent, or Firm* — Intellectual Property Center, LLC; Arthur K. Shaffer

(57) ABSTRACT

The present invention provides a mobile mounting system for releasably supporting an elongated vessel on a vehicle support member, the mobile mounting system comprising a handgrip extending from a curved end to an angled end, a mount in receipt of the handgrip and a hinge operably extending between the handgrip and the mount, the hinge configured for pivotal operation of the handgrip about a pivot axis extending through the curved end and a release mechanism operably connect to the angled end.

3 Claims, 8 Drawing Sheets

(56) References Cited

U.S. PATENT DOCUMENTS

| | | | | |
|---|---|---|---|---|
| D394,240 S * | 5/1998 | Cucheran | .................... | D12/412 |
| 5,799,849 A * | 9/1998 | Beer | ....................... | B60R 11/00 |
| | | | | 224/282 |
| 5,887,774 A * | 3/1999 | Bethune | .................. | B62J 99/00 |
| | | | | 224/414 |
| 6,032,841 A * | 3/2000 | Johnson | .................... | A45F 5/02 |
| | | | | 224/148.6 |
| 6,182,872 B1 * | 2/2001 | Six | ........................... | A45F 3/00 |
| | | | | 224/148.3 |
| 6,863,198 B1 * | 3/2005 | Darby | ...................... | B60R 7/02 |
| | | | | 224/403 |
| 7,503,535 B2 * | 3/2009 | Ziaylek | ................... | A62B 9/04 |
| | | | | 248/313 |
| D628,949 S * | 12/2010 | Farber | ........................ | D12/412 |
| D642,113 S * | 7/2011 | Farber | ........................ | D12/414 |
| 8,602,278 B2 * | 12/2013 | Sweigart | .................. | B62J 11/00 |
| | | | | 224/148.4 |
| 9,126,540 B2 * | 9/2015 | Bogoslofski | .............. | B60R 9/08 |
| 9,925,909 B2 * | 3/2018 | Byham | .................. | B60P 3/055 |
| 2004/0256428 A1 * | 12/2004 | Meggiolan | .............. | B62J 11/00 |
| | | | | 224/414 |
| 2005/0156001 A1 * | 7/2005 | Dal Pra | .................... | B62J 99/00 |
| | | | | 224/414 |
| 2007/0000961 A1 * | 1/2007 | Chung | .................... | B62J 11/00 |
| | | | | 224/425 |
| 2007/0090117 A1 * | 4/2007 | Terry | .................... | F17C 13/084 |
| | | | | 220/628 |
| 2007/0152002 A1 * | 7/2007 | Dollar, Jr. | .............. | B60R 11/00 |
| | | | | 224/404 |

* cited by examiner

MOBILE TANK MOUNTING SYSTEM

FIELD OF THE INVENTION

The present invention is broadly directed to support brackets and more particularly to a quick release mobile mounting system adapted for use with an elongated vessel or tool which securely stores the elongated vessel or tool during movement while allowing for quick release from the mount as needed.

BACKGROUND OF THE INVENTION

Cylindrical tanks containing gasses and liquids, like fire extinguishers, are used in buildings like homes and offices and while traveling in vehicles like aircrafts, cars, trucks, vans, SUVs, boats, trains, fire engines, balloons, construction vehicles and various construction types of equipment. For storage, these tanks are typically placed near a wall or cabinet. However, in some cases, these tanks may be knocked over or fall behind something else, making it difficult to rapidly locate the tank in times of need.

In some cases, tanks are vertically mounted to a wall-like structure. If you are unfamiliar with the building, these tanks can be difficult to locate and, in some cases, may be in the area of the emergency, like a fire. In addition, if the wall-like structure is in a vehicle, the interior of the vehicle, aircraft, boat or the like may be subject to surrounding forces which may dislocate the tank or the wall may be damaged or separated from the passenger compartment such as during an accident, making the tank difficult to reach at a time when it is needed most.

Some tanks are mounted within a vehicle with plural circular brackets, like hose clamps, which involves unscrewing plural latches or removal of plural clamps. If an occupant of a vehicle is in a wreck, they may not have any tools nearby to remove or unscrew the clamp. In addition, if the occupants are injured, they may not be able to obtain any tools or unscrew or unlatch the clamps to remove the tank. Thus, there is a need for an improved mounting system which allows for removal of the tank without unscrewing or unfastening various brackets or clamps which are used to secure the tank.

If the tank can be reached, current mounting systems make it difficult to release the tank when needed. For example, some current mounting systems involve a rotary bracket which requires unlatching a plurality of latching mechanisms to prevent accidental release. However, when needed, unlatching a plurality of latches can be difficult and depending on the placement of the bracket, can be obstructed based on the narrow spaces available for mounting in a vehicle. Obstruction of the release mechanism based on use within a vehicle can cause the tank to be useless at the time when it is needed most.

Accordingly, there is a need for a quick release tank mounting system which is adapted for use within a vehicle and allows for secure mounting of the tank within the vehicle and allows for quick release of the tank from the mount when needed which addresses at least a portion of the aforementioned shortcomings.

SUMMARY OF THE INVENTION

The present invention includes a mobile mounting system for releasably supporting an elongated vessel on a vehicle support member said mobile mounting system comprising a handgrip extending from a curved end to an angled end; a mount in receipt of said handgrip; a hinge operably extending between said handgrip and said mount, said hinge configured for pivotal rotation of said handgrip about a pivot axis extending through said curved end; and a release mechanism operably connected to said angled end and configured for release of said handgrip from said mount.

Various objects and advantages of the present invention will become apparent from the following description taken in conjunction with the accompanying drawings wherein are set forth, by way of illustration and example, certain embodiments of this invention. The drawings submitted herewith constitute a part of this specification, include exemplary embodiments of the present invention, and illustrate various objects and features thereof.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
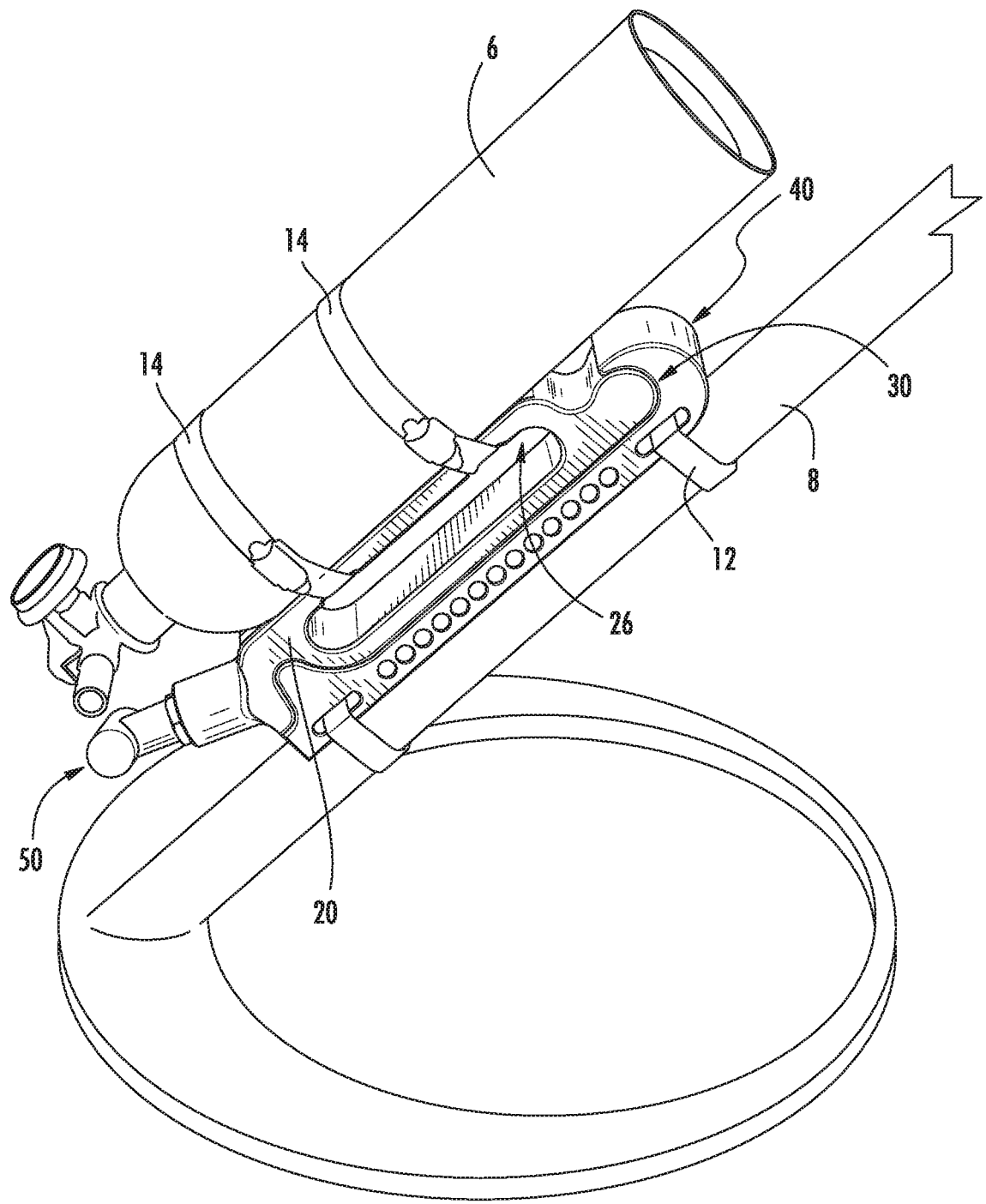
FIG. 1 is a left side perspective view of an exemplary embodiment of the mobile tank mounting system in receipt of a cylindrical tank.

Referring to the drawings in more detail, the reference numeral 10 generally refers to an embodiment of the present invention, a mobile tank mounting system adapted for use within a vehicle or a building structure for securing a tank 6, elongated tool, elongated vessel or other storage object during storage and providing a mechanism for removal of the tank 6 for use in times of need. As illustrated in FIG. 1, the mobile tank mounting system 10 is generally secured to a support structure 8 like a wall support or other support member. Because the current invention can be operated in a number of different configurations, the cylindrical tank 6, elongated tool, elongated vessel or other storage object can be secured in a variety of orientations including vertical, horizontal or angled in an upright or even in an upside-down position.

As further illustrated in FIG. 1, the mobile tank mounting system 10, generally includes a handgrip 20 and a mount 40 extending from a hinge 40 to a quick release mechanism 50, the bracket 20 and mount 40 releasable at the quick release mechanism 50 and rotatable about the hinge 30. Generally, the combination of the hinge 40 and quick release mechanism 50 provides pivotable releasable securing means for quickly separating the handgrip 20 from the mount 40 as desired.

The cylindrical tank 6 or other elongated tool or elongated vessel is generally secured to the handgrip 20 with at least one tank strap member 14 and as depicted in FIG. 1, may include two or more tank strap members 14. In the depicted illustration, the mount 40 is secured to the support member 8 with at least one mounting strap 12 and as depicted may include two or more mounting straps 12. While both tank strap members 14 and the mounting straps 12 are depicted as a band, strap, tie or wrap extending circumferentially around the generally elongated structures, straps are well known and may include a variety of connecting means for securely attaching the handgrip 20 and the mount 40 for use as disclosed herein. In addition, while the depicted embodiment includes the cylindrical tank, the mobile tank mounting system 10 can be used to store a variety of elongated tools or vessels which would benefit from mounting to a support member 8 using a two-piece mounting system which is stored in a harsh environment for ready access by activation of a simple quick release mechanism to separate the storage vessel 2 from the support member 8.

Figure 2:
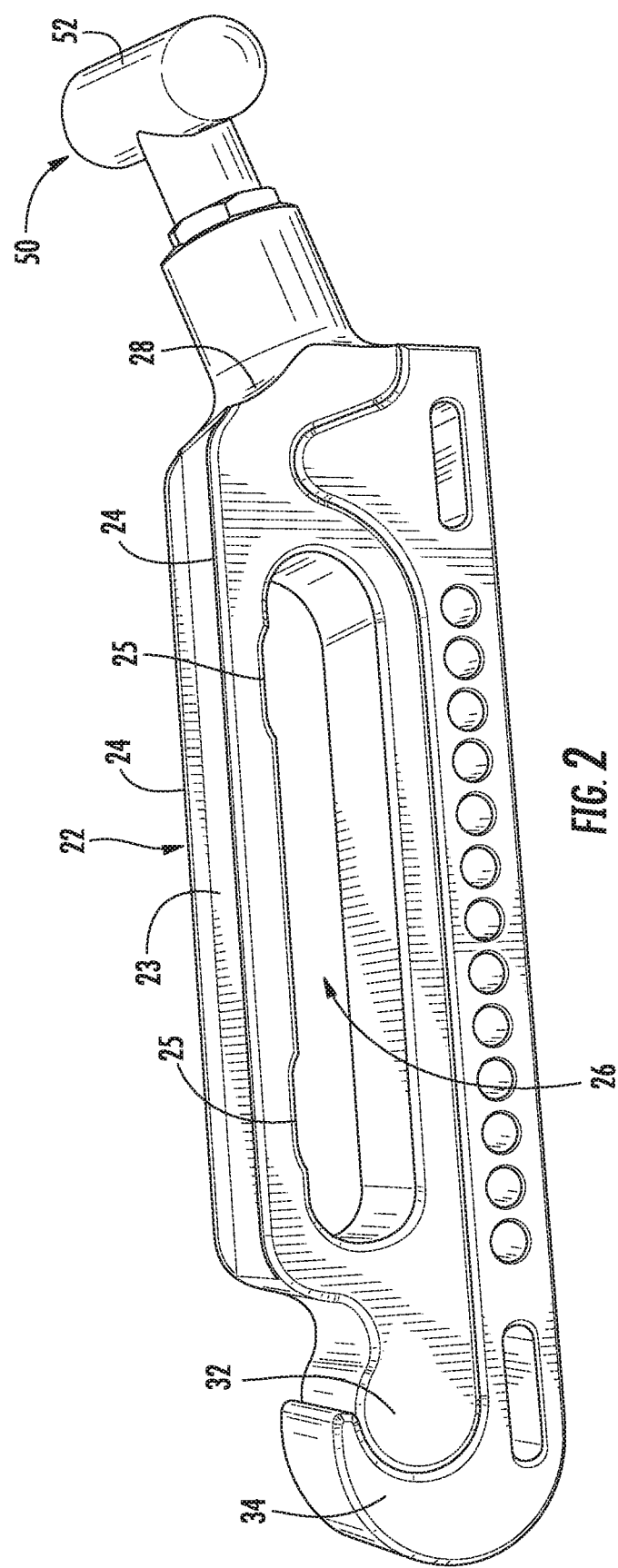
FIG. 2 is a side perspective of the exemplary embodiment of FIG. 1.

As illustrated in FIG. 2, the handgrip 20 has a generally elongated body 21 with an upper bracket surface 22 adapted for engagement with the cylindrical tank 6, elongated vessel or elongated tool and a lower bracket surface 27 configured for receipt by the mount 40. The handgrip 20 provides for an improved grip of the cylindrical tank 6 or other secured object during use, to help limit accidental slippage of the secured object 6 after separation of the handgrip 20 from the mount 40. The depicted embodiment of the elongated body 21 encircles an elongated handhold 26 which is illustrated with sufficient dimensions for receipt of a hand (not shown) for lifting or holding the handgrip 20 during use. Tanks 6 or other cylindrical vessels along with various tools and equipment referred to herein as secured object 6 can be difficult to hold and maneuver and may inadvertently slip or fall during use. The handhold 26 provides for one-handed, convenient access to the handgrip 20 along with improved grip of the secured object 6 for use as needed. The handhold 26 may be smaller, bigger or shaped differently as desired and in some embodiments, the handhold 26 may be omitted from an embodiment of the present invention. Generally, the elongated body 21 extends from a generally curved end 32 to a generally angled end 28 which extends angularly outward towards the quick release mechanism 50.

The depicted embodiment of the upper bracket surface 22 generally includes a channel 23 extending between a pair of sidewalls 24. Generally, the channel 23 and pair of sidewalls 24 are configured for receiving the cylindrical tank 6. The height of the channel 23 and pair of sidewalls 24 are configured for spaced apart receipt of the cylindrical tank 6. Generally, the channel 23 is configured for receipt of the outer circumference of the vessel sidewall associated with the cylindrical tank 6. Alternatively, the sidewalls 24 may be small, bigger or omitted. In addition, the channel 23 may be contoured for receiving the cylindrical tank 6 or other storage vessel (not shown). In addition to cylindrical tanks 6, the channel 23 may also be used to repeatedly, retrievably store hand-tools, impact wrenches, shovels and axes with an elongated handle, drills or other equipment such as those needed by emergency response personnel or utility workers who may have a need for ready access to a particular device which can be securely mounted on or to a vehicle for storage and then accessed using the unique two-part system further described below. The use of the term tank in the description of the present invention is not meant to be limited, but simply, illustrative of one of the types of structures which can be used with the present invention. For the purposes of disclosure, the term tank is a shorthand term meant to imply the use of the present invention with storage vessels, elongated vessels or tools and hand held equipment which would benefit from the present invention.

As further illustrated in FIG. 2, the generally elongated body 21 also includes a pair of strap guides 25 extending upward from the inner wall surrounding the elongated handhold 26. The strap guides 25 are generally configured for receiving and aligning the tank strap members 14 for securing the tank 6 along the upper bracket surface 22. The tank straps 14 may also be used for securing other hand tools (not shown) in alignment with the upper bracket surface 22.

The mount 40 is configured for releasable separation of the handgrip 20 with the quick release mechanism 50 located at one end of the mount 40, for pivoted operation at the other end with hinge 30 and for being mounted to the support structure 8. The illustrated embodiment of the mount 40 is asymmetrical to said handgrip 20. In addition, the connections to the support structure 8 are wider than the connections between the handgrip 20 and the elongated vessel 6. The wider connections on the mount 40 provide for greater support during pivoted rotation of the handgrip 6 while keeping the mount 40 more securely attached to the support structure 8. The mount 40 generally includes an upper mount surface 46 and a lower mount surface 47, the upper mount surface 46 being generally complementary to the shape of the lower bracket surface 27.

Figure 3:
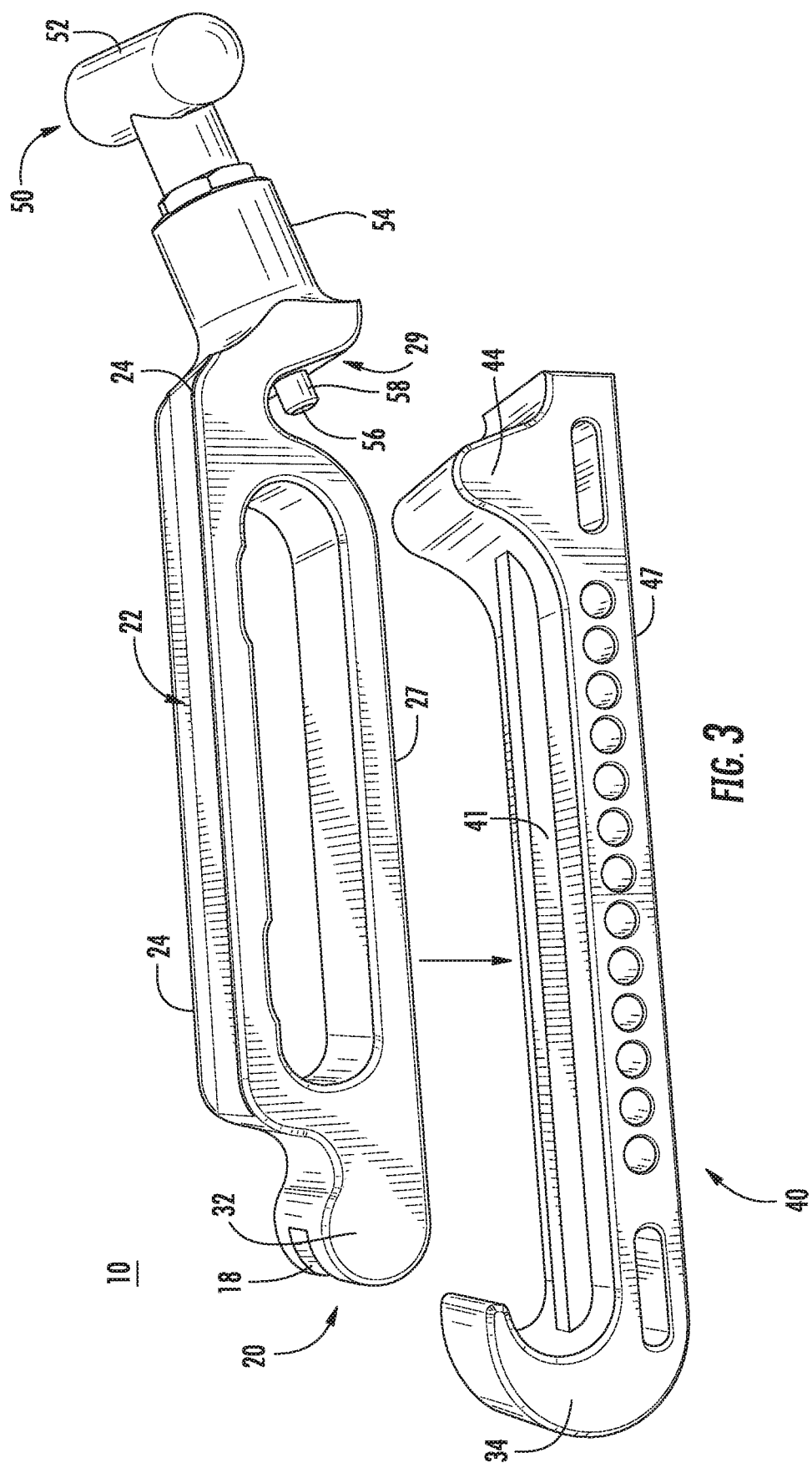
FIG. 3 is a side perspective of the exemplary embodiment of FIG. 1 showing the release mechanism with a handgrip separated from an exemplary mount according to the embodiment of FIG. 1.

As illustrated in FIG. 3, the embodiment of the mount 40 generally extends between a ridge 44 to the curved receiver 34, the upper mount surface 46 and lower mount surface 47 extending therebetween. For operation of the hinge 30, the curved receiver 34 has complementary structure to the curved end 32. Operation of the quick release mechanism 50, the curved ridge 44 has a generally arcuate structure for receipt within a similarly shaped arcuate ridge receiver 29. The curved ridge 44 is generally positioned near the quick release mechanism 50 and associated with the lower bracket surface 27. The arcuate ridge receiver 29 corresponds to the curved ridge 44 extending upwardly from the upper mount surface 46 associated with the depicted embodiment of the handgrip 20 illustrated in FIG. 3. The combination arcuate ridge receiver 29 and curved ridge 44 helps align the handgrip 20 on the mount 40, the bearing 58 being aligned for engaged receipt by the bearing receiver 59. The curved ridge 44 may include a variety of configurations including, arcuate or linear surfaces which are complementary shaped and which are designed for mating the curved ridge 44 to the arcuate ridge receiver 29.

As further illustrated in FIG. 3, aligned pivoted rotation of the curved end 32 about the curved receiver 34 is assisted with a guide 41 adapted for receipt by a slotted groove 18. Generally, the guide 41 extends upwardly from the upper mount surface 46 and along the mount 40 from the curved ridge 44 to the curved receiver 34. The guide 41 is configured for receipt by the complementary groove 18. The groove 18 generally extends along the lower bracket surface 27 and along the curved end 32. Alternatively, the guide 41 could be associated with the lower bracket surface 27 and the groove 18 could be associated with the upper mount surface 46. Another alternative embodiment may include using a locating device (not shown) for determining lateral alignment of the handgrip 20 in relation to the mount 40, with for example, using two or more locating points (not shown).

During pivoted operation, the quick release mechanism 50 is disengaged and rotated upward with the curved end 32 rotating in a generally counterclockwise orientation about the pivot axis centrally extending therethrough. As the curved end 32 rotates within the curved receiver 34, the groove 18 traverses the guide 41. In this way, the alignment of the handgrip 20 is maintained during pivoted rotation of the curved end 32 with respect to the curved receiver 34. Once the handgrip 20 is pivoted to the desired orientation, the handgrip 20 may be separated from the mount 40.

Figure 4:
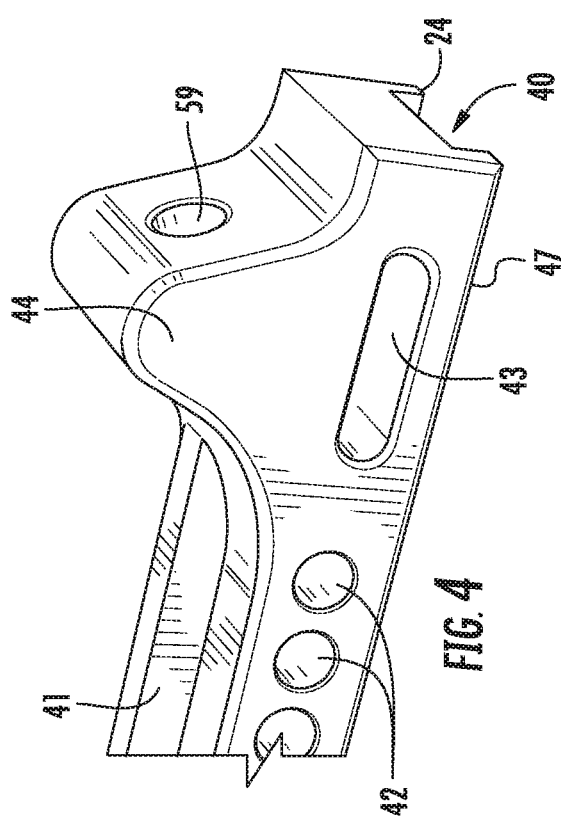
FIG. 4 is a fragmentary side perspective of the exemplary mount according to the embodiment of FIG. 1.

FIG. 4 illustrates a section of the mount 40 near the ridge 44 which better illustrates the curved structure of the ridge 44 and the bearing receiver 59. The ridge 44 may include a variety of arcuate or planar structures which can be used to align and support the handgrip 20. The bearing receiver 59 is generally adapted for receipt of the bearing 58 associated with the quick release mechanism 50.

Figure 5:
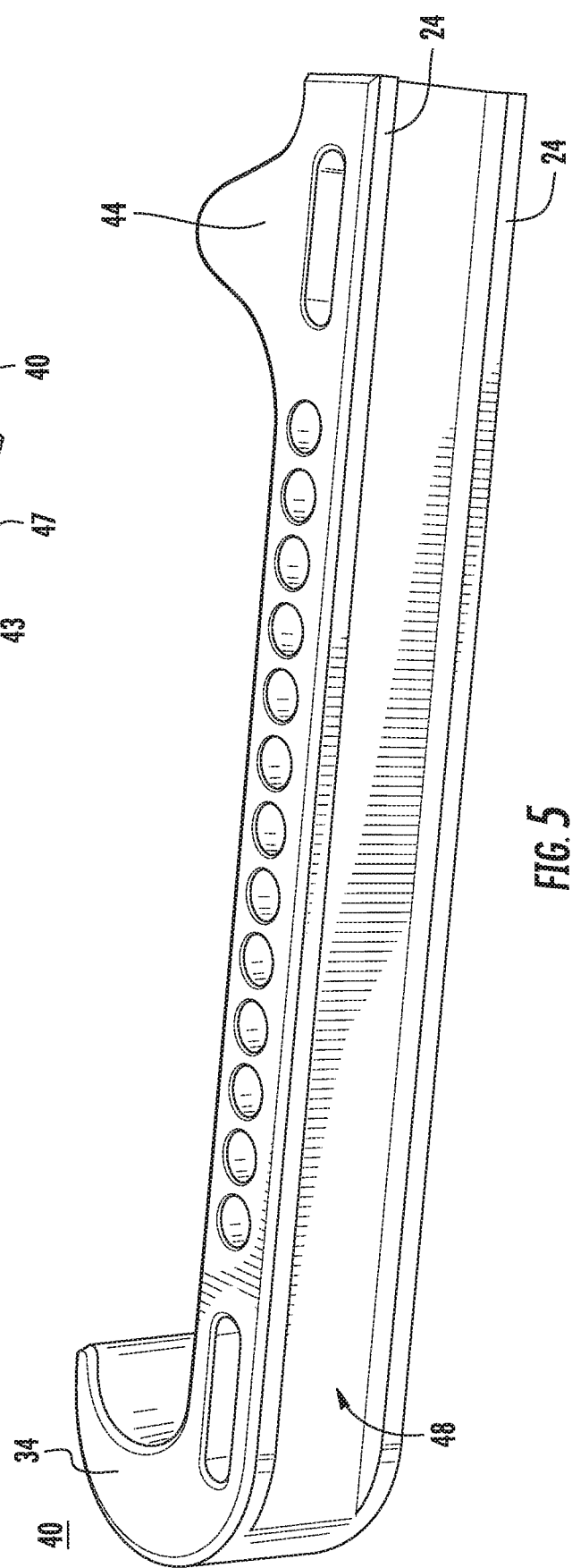
FIG. 5 is a bottom plan view of the exemplary mount according to the embodiment of FIG. 1.
Figure 6:
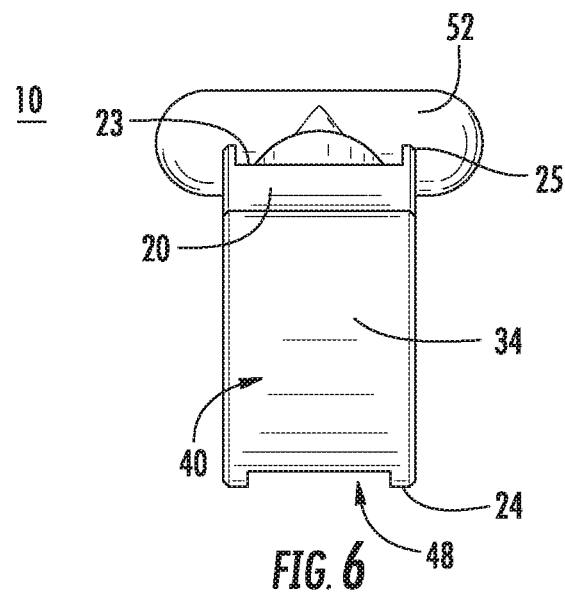
FIG. 6 is a rear elevation of the mobile tank mounting system according to the embodiment of FIG. 1.
Figure 7:
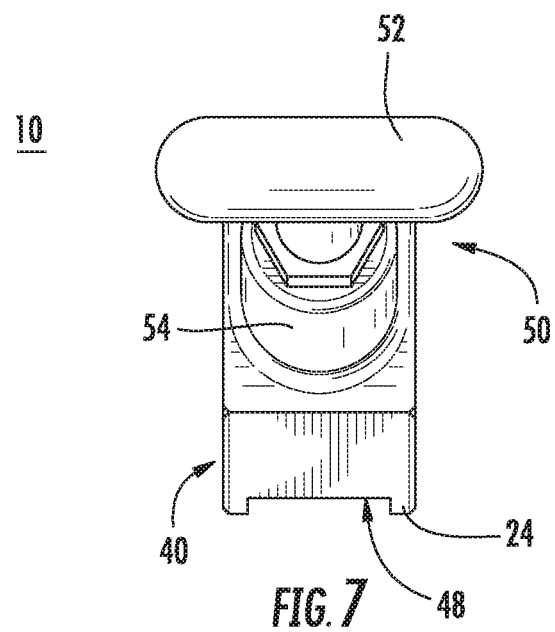
FIG. 7 is a front elevation of the mobile tank mounting system according to the embodiment of FIG. 1.
Figure 8:
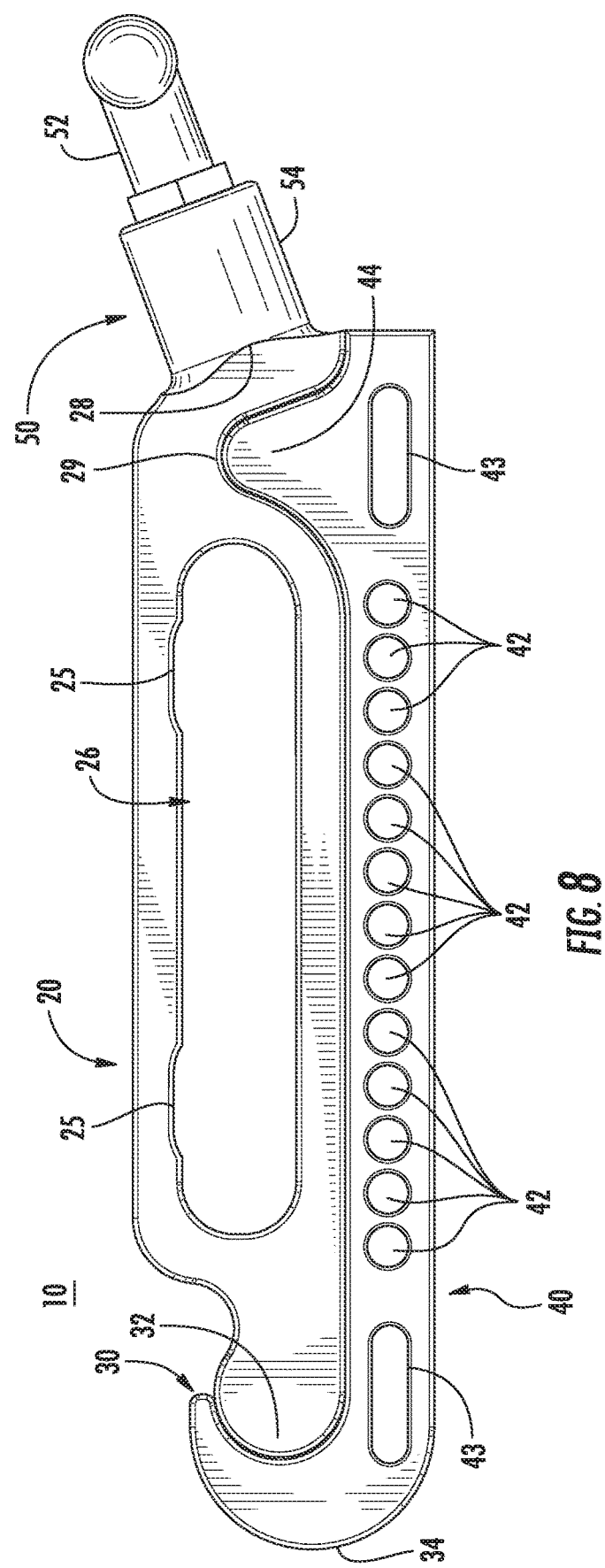
FIG. 8 is a side elevation of the mobile tank mounting system according to the embodiment of FIG. 1.
Figure 9:
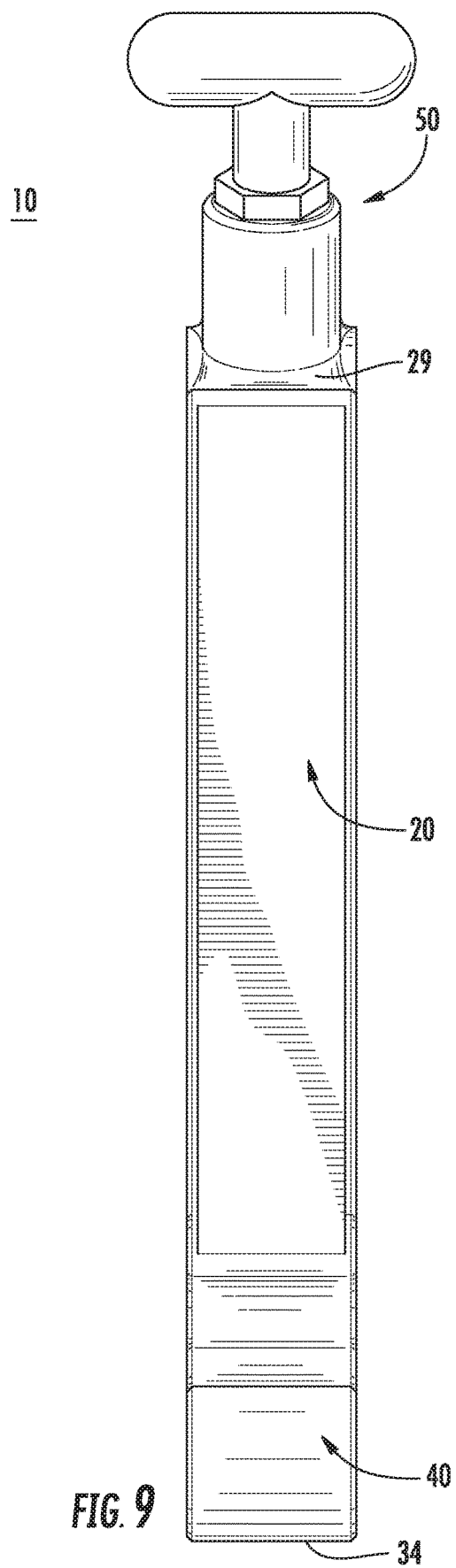
FIG. 9 is a top plan view of the mobile tank mounting system according to the embodiment of FIG. 1.
Figure 10:
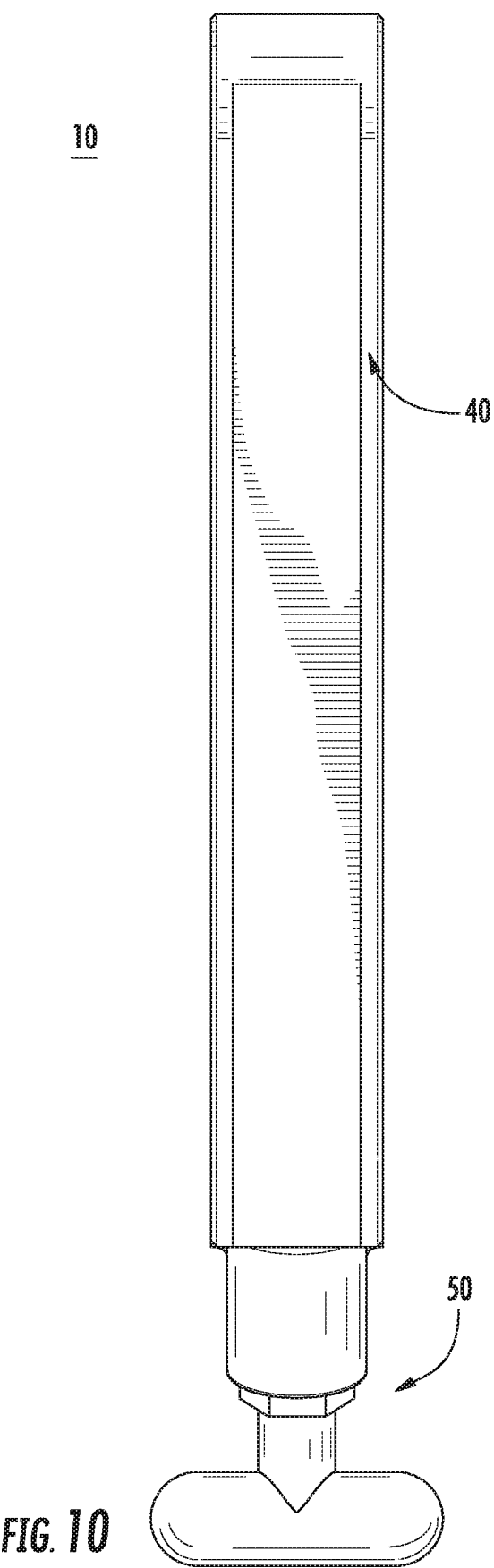
FIG. 10 is a bottom plan view of the mobile tank mounting system according to the embodiment of FIG. 1.

The lower mount surface 47 illustrates a lower channel 48 extending along the lower mount surface 47 which may be used in mounting the mount 40 to a support structure 8. The elongated slot 43 is also illustrated along with plural apertures 42 which may also be used to secure the mount 40 to a support structure 8, or other structure as desired. The lower channel 48 is further illustrated in FIG. 5 extending between a pair of sidewalls 24, similar to the pair of sidewalls 24 which span the channel 23 associated with handgrip 20. Generally, the channel 23 is configured for the tank 6, or other equipment, and the lower channel 48 is configured mounting the mount to a support structure 8. Depending on the desired configuration, the lower channel 48 may be configured without regard to the channel 23 having varying dimensions and shapes.

The hinge 30 is configured for pivotally joining one end of the handgrip 20 and the mount 40 about a pivot axis. The hinge 30 also allows for angular separation of the handgrip 20 from the mount 40 for rapid access of the tank 6 or when they are matted together for storage. Generally, the hinge 30 includes complementary curved surfaces configured for rotation. One embodiment includes the curved end 32 associated with the handgrip 20 depicted in FIG. 3 and the curved receiver 34 associated with the mount 40. The hinge 30 is configured with a pair of complementary curved surfaces, such as complementary concave and convex surfaces illustrated in FIG. 3, although other complementary surfaces which provide for pivoted rotation of the handgrip 20 from the mount 40 may be utilized. Alternatively, the hinge 30 could include a mechanical fastener (not shown) fixing the curved end 32 to the curved receiver 34 along the pivot axis (not shown).

The quick release mechanism 50 includes a T-shaped handle 52 which is easy to grip and pull from a variety of angles. The T-handle 52 is generally "T" shaped and configured for receipt within a cylindrical body 54 which houses a plunger mechanism (not shown) which is used for releasably latching the handgrip 20 to the mount 40. In general, the plunger mechanism (not shown), as is generally known, includes a spring, an outer sleeve, a shaft which extends through the outer sleeve and a nose 56 adapted for receipt of a bearing 58.

In general, the quick release mechanism 50 is moveable between an extended and a retracted position by pulling the T-handle 52. The retracted position is illustrated in FIG. 3. In the retracted position, the nose 56 is retracted towards the cylindrical body 54 and the bearing 58 is moved rearwardly for disengagement of the mount 40. In the depicted embodiment, the quick release mechanism 50 is biased towards the extended position. As the T-handle 52 is released, the nose 56 is extended from the cylindrical body 54 and the bearing 58 is configured for receipt within a bearing receiver 59 associated with the mount 40. Although the plunger mechanism includes a T-shaped handle 52, any type of knob which is easy to grip and pull from a number of angles as desired can be utilized with any embodiment of the present invention, which should be readily understood.

Alternatively, the bearing 58, bearing receiver 59 combination may utilize a locking pin (not shown) assembled in triangulated fashion to allow for a positive lock between the nose 56 and the bearing receiver 59, for example, by using an extendable pin (not shown) configured to extend through the bearing 58, which is retractable by activating a push-button (not shown) on the T-handle 52.

While the depicted embodiment includes apertures 42 or slotted openings 43 referred to herein as slots, other compatible securing structures between the handgrip 20 and the mount 40 may be utilized which allow for storage of various tanks 2 (or other elongated vessels) on a support structure 8 and pivoted rotation, removal or use of the stored tanks 2 or other elongated vessels. The secured structures may utilize a complementary structure for receipt by the apertures or slotted openings 32 of straps or fasteners as desired.

It is to be understood that while certain forms of the present invention have been illustrated and described herein, it is not to be limited to the specific forms or arrangement of parts described and shown.

What is claimed and desired to be secured by Letters Patent:

1. A mobile mounting system for releasably supporting an elongated vessel on a vehicle support member said mobile mounting system comprising:
   a handgrip extending from a curved end to an angled end;
   a mount in receipt of said handgrip;
   a hinge operably extending between said handgrip and said mount, said hinge configured for pivotal rotation of said handgrip about a pivot axis extending through said curved end;
   a release mechanism operably connected to said angled end and configured for release of said handgrip from said mount; and
   a T-handle which extends or retracts a plunger mechanism located within a cylindrical body associated with said release mechanism.

2. A mobile mounting system for releasably supporting an elongated vessel on a vehicle support member said mobile mounting system comprising:
   a handgrip extending from a curved end to an angled end;
   a mount in receipt of said handgrip;
   a hinge operably extending between said handgrip and said mount, said hinge configured for pivotal rotation of said handgrip about a pivot axis extending through said curved end;
   a release mechanism operably connected to said angled end and configured for release of said handgrip from said mount; and a T-handle operator extending from said angled end and in communication with said release mechanism.

3. The mobile mounting system of claim 2 whereby said T-handle operator moves said release mechanism between an extended and a retracted position.

\* \* \* \* \*